United States Patent

[11] 3,597,905

| [72] | Inventor | Virgil N. Jarrell<br>West Evans Road, Viola, Del. 19979 |
|---|---|---|
| [21] | Appl. No. | 817,811 |
| [22] | Filed | Apr. 21, 1969 |
| [45] | Patented | Aug. 10, 1971 |

[54] POD-STRIPPING MACHINE
23 Claims, 13 Drawing Figs.

[52] U.S. Cl. .................................................. 56/11.9,
130/30 C, 56/12.8, 56/16.6, 56/14.6
[51] Int. Cl. ...................................................... A01d 45/22,
A01d 45/24
[50] Field of Search .......................................... 56/19, 128,
129, 130; 130/27, 30

[56] References Cited
UNITED STATES PATENTS

| 1,196,458 | 8/1916 | Jockisch | 130/30 |
| 1,216,149 | 2/1917 | Macleary et al. | 130/30 |
| 1,744,906 | 1/1930 | Livermon | 130/30 |
| 2,862,342 | 12/1958 | Fergason | 56/12 |
| 2,974,467 | 3/1961 | Long | 56/19 |
| 3,381,455 | 5/1968 | Mitchell | 56/19 |
| 3,404,517 | 10/1968 | Whitfield et al. | 130/30 |

*Primary Examiner*—Russell R. Kinsey
*Attorney*—Mason, Fenwick & Lawrence

ABSTRACT: A self-propelled machine for stripping pods from vines, which has means for lifting cut vines from the field and feeding them sequentially to a plurality of drums having spring fingers to engage vines and carry them through spaced fingers of a stationary, or movable, concave about part of the drum, to shred the vines and strip the pods from them. Pods are collected on conveyors below the drum stations and carried to a storage bin. The bin has means to unload the pods to a transporting vehicle, or place of storage.

Patented Aug. 10, 1971

INVENTOR

VIRGIL N. JARRELL

BY Mason, Fenwick & Lawrence
ATTORNEYS

Patented Aug. 10, 1971

INVENTOR
VIRGIL N. JARRELL
BY
Mason, Fenwick
& Lawrence
ATTORNEYS

POD-STRIPPING MACHINE

BACKGROUND OF THE INVENTION

This invention relates to harvesting machines, and particularly to machines for picking up vine crops and separating the food-bearing pods from the vines.

For many years the harvesting of products, such as beans and peas, was done by manually stripping the pods from the vines in the field, and then opening the pods at the place where the food was to be processed. This is a very slow and expensive way of harvesting the crops.

Later, the vines were cut in the field and the cut vines and pods were run through a horizontal drum having a perforated shell through which the threshed product could pass. Paddles beat the vines to release the product, with consequent release of moisture from the green vines to mix with the threshed product and cause spoilage if the product was not processed quickly. In addition, the great mass of material passing through the machine in proportion to the amount of harvested crop resulted in inefficient use of the machine.

SUMMARY OF THE INVENTION

The general object of the present invention is to provide a pod-stripping machine which will be capable of separating the pods from the vines, so that the pods only need be run through the drum-type threshing apparatus.

Another object is the provision of such mechanism in which the vines are caused to move along paths defined by oppositely moving, or differentially moving, toothed members to pull the pods from the vines.

A further object is to provide means which will shred the vines to facilitate reaching all pods for removal.

Yet another object is to provide a machine of this nature having a pod-receiving means which travels in generally the same direction, and beneath, the vine path through the machine.

A still further object of the invention is to provide a pod stripping machine having means to accumulate and store pods removed from the vines, and to empty the storage means when desired.

Other objects of the invention will become apparent from the following description of one embodiment thereof, when taken in conjunction with the drawings which accompany, and form part of, this specification.

DESCRIPTION OF THE PREFERRED EMBODIMENT

The machine of the present invention is a self-propelled one which can travel across a field of cut vines, gather the vines and move them through the machine to the several operating stations where the pods are stripped from the several operating stations where the pods are stripped from the vines and the pods and vines are separated and carried along different paths to points of deposit.

Referring first to FIGS. 1, 2, 3, 4A and 4B, it will be seen that the machine is built upon a wheeled frame 1 which consists of longitudinally extending rails 2, which are parallel and spaced apart. The rails 2 are joined at the rear by a box frame member 2, and at the front by a rigid axle 4. At one side of the frame, a power plant and control unit 5 is secured to the frame. This can be a conventional unit such as normally used in threshing machines and similar pieces of equipment. The unit 5 includes a power plant 6, an operator's seat 7, and the usual steering wheel 8 and other necessary controls. Front wheels 9 are mounted on the trunnion ends of the axle 4 and driven from the power plant 6 by conventional means which are not shown. The rear wheels 10 are mounted for steering, and are controlled by the steering wheel 8. For simplicity, the steering mechanism has been eliminated from the drawings.

Insofar as the power plant unit is concerned, it is only necessary to an understanding of the present invention to know that it furnishes the power for moving the machine in the field, and the mechanism for controlling the machine movement and direction. This unit is attached at the side of the frame formed by the longitudinal rails, and comprises a continuation of the wheeled frame 1. The power plant unit has a power take off shaft 11 from which all of the parts of the machine are driven, as will be described.

At the front of the machine, there are vertical channels 12 which rise upwardly from the longitudinal side rails 2. Near the rear of the machine, there are additional vertical channels 13, and horizontal frame channels 14 are connected to and supported by, the vertical channels 12 and 13. All of the parts of the machine are mounted upon, or supported by, the several channel members, or from other structural members which are in turn mounted upon these primary members. Sidewalls 15, attached to the channels 12, 13 and 14, define a passageway 16 through the machine, the passageway having considerable vertical height. Most of the operating members of the machine bridge the passageway 16.

At the forward end of the passageway 16, there is a shaft 17, which traverses the passageway and is journaled in the horizontal frame channels 14. The ends of shaft 17 project beyond the sidewalls 15 and have side frames 18 of a vine pickup and feed unit 19 pivotally mounted on them. The unit 19 includes a lower vine pickup section 20 and an upper vine feeding section 21. The vine pickup section 20 carries support wheels 22 to maintain the unit in proper relation with respect to the ground. Fluid cylinder assemblies 23 are pivotally interconnected between the longitudinal rails 2 of the main frame and the vine feeding section 21 of the unit 19.

The sections 20 and 21 of the unit 19 are separate, and pivotally interconnected by means of a shaft 24, so that the vine pickup section may have limited pivotal movement relative to the vine feeding section. This allows the vine feeding section 21 to be held stationary by the cylinder assemblies 23, while the vine pickup section 20 can follow ground contour. The side frames 18 carry outwardly projecting stop ledges 25 against which the edge of the side frames 26 abut when the cylinders are operated so that the two sections may be raised as a unit to an inoperative, carrying position when the machine is to be transported from one place to another.

The vine pickup section 20 includes the side members 26, which are held in spaced relation by means of a channel 27 located near the rear of the unit frame. Forwardly of the channel 27, there is a shaft 28 extending transversely across the section and journaled in the side frames 26. The shaft 28 carries disks 29 near the inner faces of the side frames 26, which disks are interconnected by a plurality of rods 30 positioned equidistant about the disks near their perimeters. The rods carry pluralities of vine pickup fingers 31 spaced along their lengths. The pickup fingers are spring members which sweep across the ground and lift the vines to move them toward the feeder section 21. In order that the spring fingers may be released from their lifting position to withdraw freely through the mass when they reach the top of their operating cycle, the rods may have positioning arms 32 on their ends to ride upon the cam 33. This will rigidly position the arms for sweeping the vines from the ground and lifting them in their movement about the vine-lifting mechanism. In order to ensure the vines having a surface on which they can move, and also to assure the free withdrawal of the lifting fingers from the vines without pulling the vines with them, there are a plurality of curved strips 34 located between the circular finger positions with the strips defining slots between them through which the vine lifting fingers can move. The strips 34 have their ends attached to opposite ends of supporting brackets 35. The brackets are connected to a rod 36 which extends across the pickup section and is seated within, and carried by the transverse channel 27.

Figure 1:
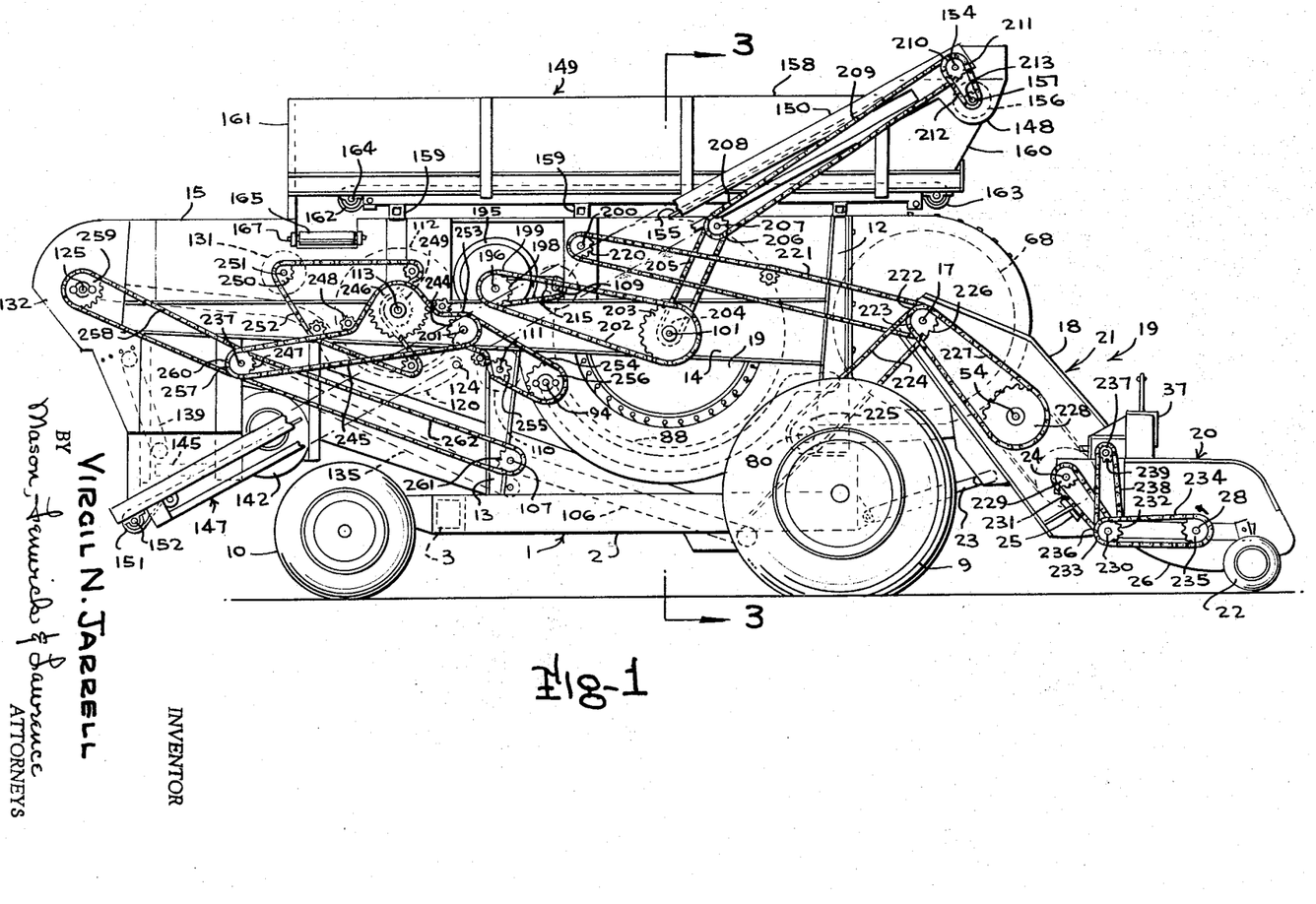
FIG. 1 is a side elevation of a pod-stripping machine embodying the principles of the present invention.
Figure 2:
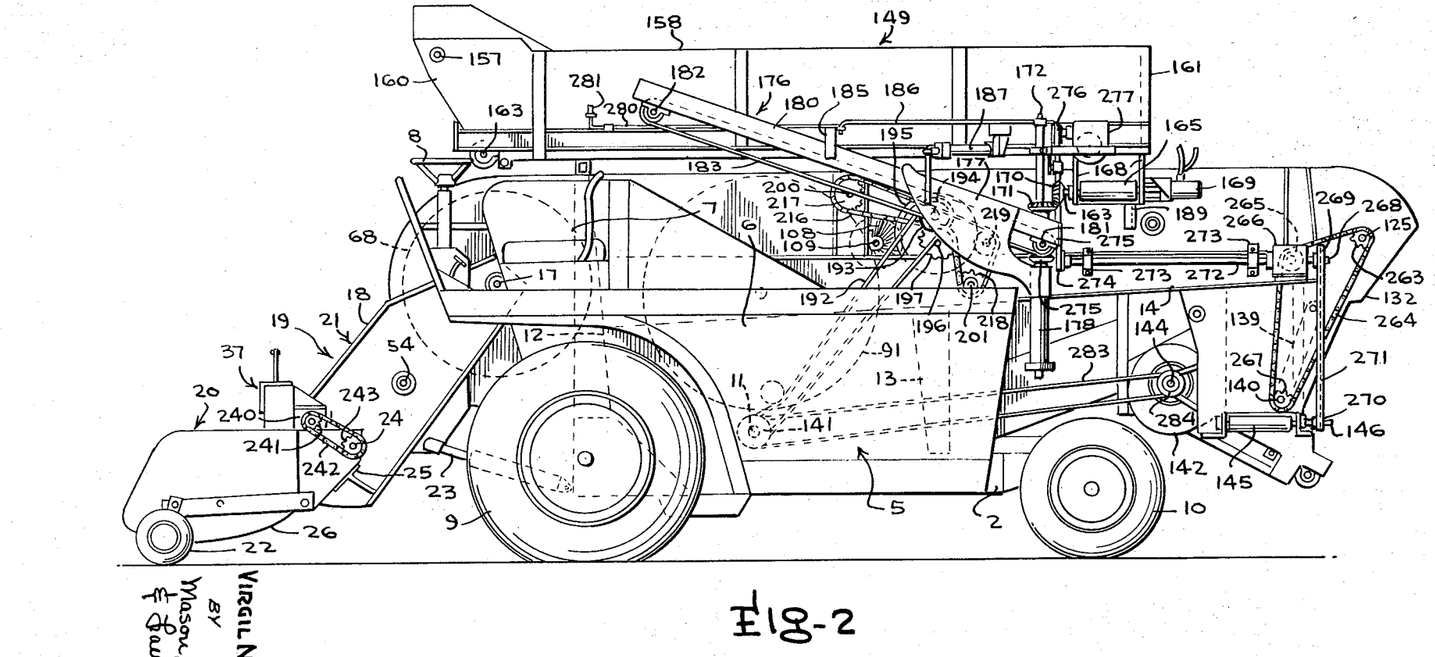
FIG. 2 is a side view of the machine, showing the opposite side of the machine from that shown in FIG. 1.
Figure 3:
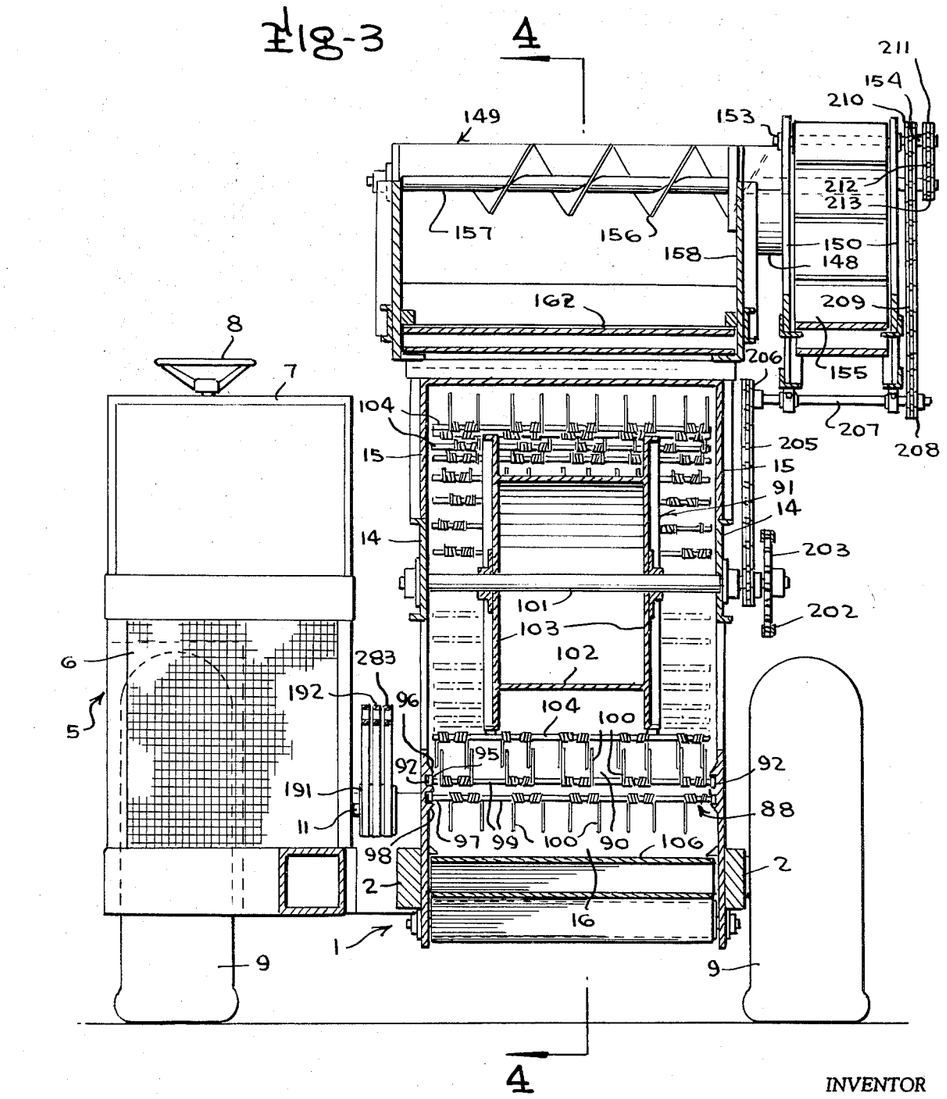
FIG. 3 is a vertical, transverse, section through the machine, taken on the line 3—3 of FIG. 1.
Figure 4A:
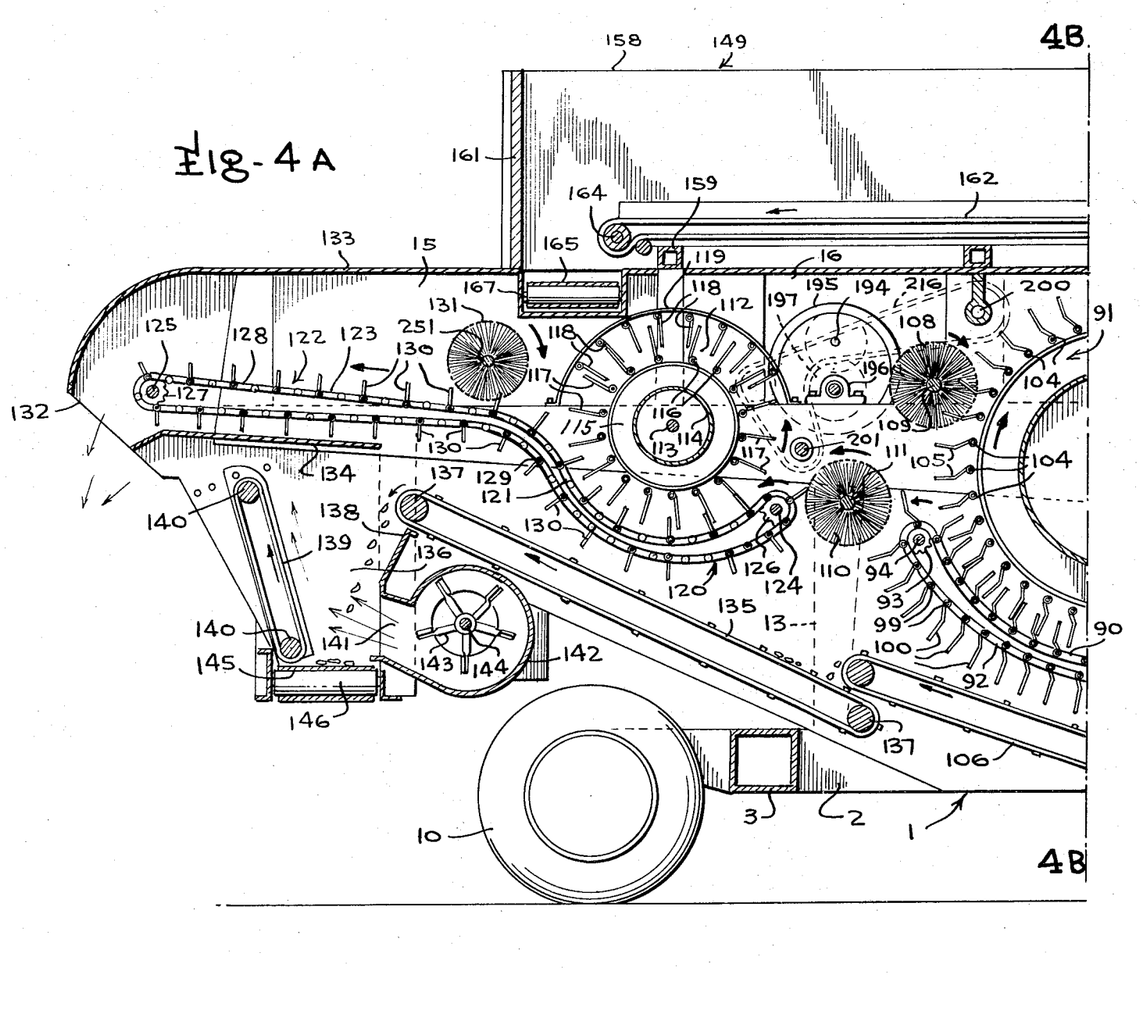
FIGS. 4A and 4B, together, illustrate a vertical, longitudinal section through the machine, taken on the line 4—4 of FIG. 3.
Figure 4B:
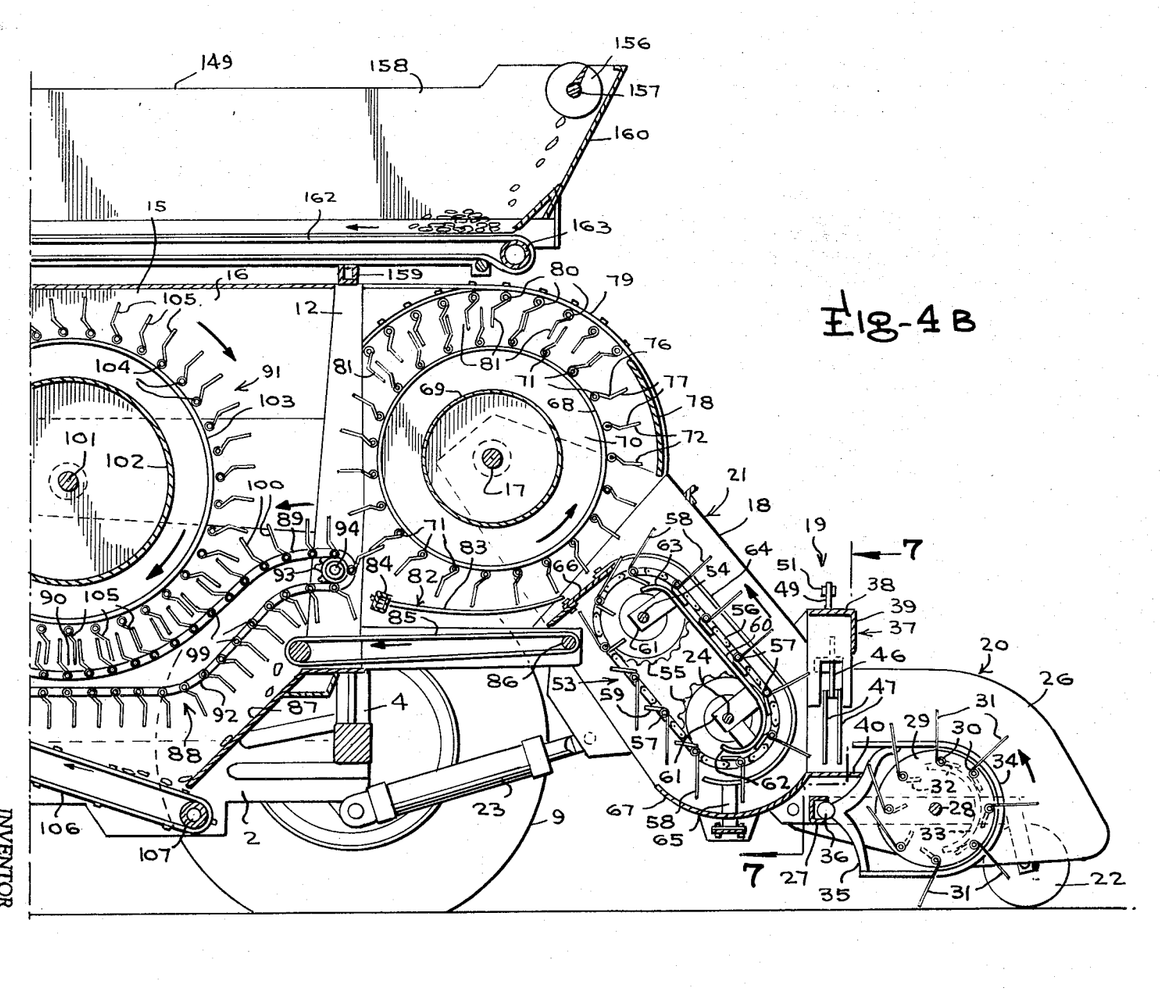

From FIG. 4B, it will be seen that as the machine moves forward, the fingers 31 move across the ground with a raking action, picking up the vines and carrying them about the forward curved face of the surface formed by the curved strips 34 and on up to the top surface formed by these strips. When the fingers reach the top, they will begin to straighten and move downwardly as the shaft and disks continue to rotate so as to be pulled more or less straight through the vines to a release position.

In order to assure a sufficient quantity of vines for feeding to the machine, the pickup section 20 is somewhat wider than the feeding section 21 or the passageway 16, and means are provided adjacent the trailing edge of the surface formed by the curved strips 34 to condense the accumulated vines transversely to form an increased mass for feeding into the machine.

Figures 6, 7:
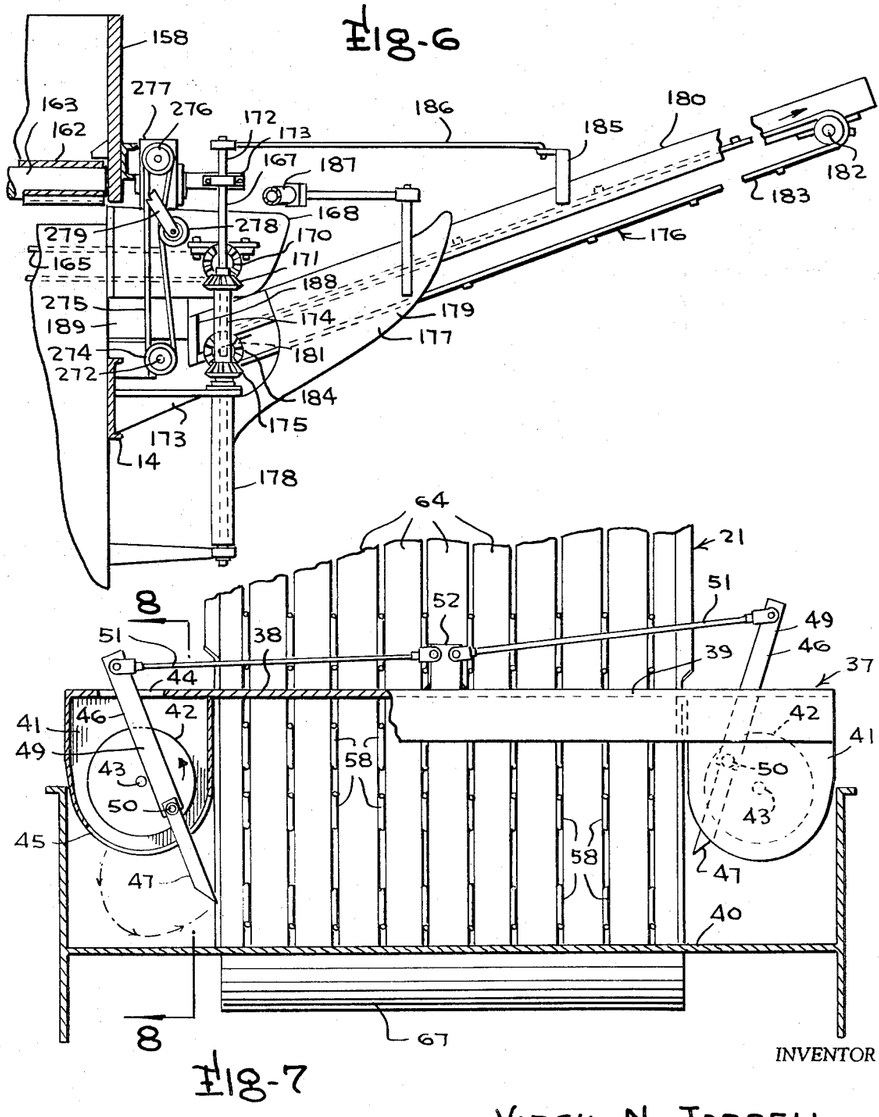
FIG. 6 is a partial vertical section through the pod bin and adjacent parts at the region of the bin-emptying conveyor, showing the conveyor in operative position.
FIG. 7 is a vertical section, taken on the line 7—7 of FIG. 4B, illustrating means for reducing the width of the vine mass coming into the machine.

The transverse condenser mechanism 37 is located adjacent the rear end of the upper section of the curved strips 34. It is housed within the same sidewalls as the vine pickup section 20, and has a top 38, a downwardly projecting front lip 39 and a floor 40 which is spaced below the tops of the trailing end of the curved strips 34 so that material moving off of the end of the surface defined by the curved strips drops onto the floor 40. At each side of the transverse condenser, and in the upper portion thereof, there are housings 41 in which are located disks 42. The disks are mounted on shafts 43 which are journaled in the transverse condenser housing, and are driven by means which will be described later. There is a slot 44 in the top of the condenser housing, directly above each of the disks 42, and another slot 45 in the bottom of each housing 41. The slots accommodate the projecting ends of condensing forks 46, which are connected to, and operated by, the disks 42. Each fork comprises a pair of tines 47, mounted in spaced relation on a hub member 48, and an operating lever 49, also carried by the hub 48 but projecting in the opposite direction from the tines 47. The hub of each condensing fork is mounted on a pivot pin 50 carried by the disks 42 at a distance from the shafts 43, so that the pivot pins 50 form cranks moving about the shafts 43 as their centers. The upper end of each fork operating lever 49 is tethered by means of a tie rod 51 to an anchor member 50 secured to the top of the condenser housing. By this arrangement, rotation of the disks will cause the forks to follow an orbital path wherein the tines move downwardly adjacent the sidewalls of the condenser and inwardly across the floor 40 to throw vines inwardly into the path of the reduced width feeding mechanism 21. The tines then move upwardly out of the vine mass and return to the outer wall above the layer of vines on the floor 40. This path of movement is illustrated in dotted lines in FIG. 7. The two forks are so positioned that they work in alteration so that only one fork at a time is moving the vines inwardly, thus reducing the amount of power necessary to operate the condenser and maintaining a relatively steady power requirement, rather than a periodic requirement which would result from having the forks operate in unison.

The vine feeder 21 consists of an endless feeding conveyor 53 which is mounted on shaft 24 and a shaft 54, journaled in the side frames 18 with one shaft being driven as will be later described. Each shaft carries a pair of sprockets 55, with one sprocket being adjacent each side frame, and the sprockets carry chains 56. Rods 57 are connected to the chains 56 and bridge the space between them. These rods are connected to the chains at equispaced points along the chains. Each rod carries a plurality of vine engaging fingers 58. These fingers are similar to the fingers of the pickup mechanism, and each has a control arm 59 for cooperation with a cam plate 60, mounted on supports 61 secured to the shafts 24 and 54. The cam plate has a leading edge 62, which is located beneath the shaft 24 at the lower end of the feeding mechanism to permit engagement of the control arms 59 as the fingers move into position to engage the vines. When the control arm is firmly seated on the cam plate, the finger is locked against rocking movement and moves as a unit with the chain. The trailing edge 63 of the cam plate is located just above the upper shaft 54 to allow the control arms to move off of the cam plate and be free to slide from the vine mass without pulling the vines about the top of the upper sprockets. A plurality of plates 64 are mounted to overlie the chains 56. The plates are substantially coextensive with the cam plate 60, and partially encircle both the lower and upper sprockets. The plates are spaced apart so as to provide slots within which the fingers 58 may move, and the combined plates form a surface on which the vines travel in their upward feeding path. These plates are mounted at their bottoms on support posts 65, and to a mounting plate 66 at the top. At the bottom of the feeding section, there is an arcuate wall 67, which is a continuation of the floor 40 of the condensing chamber, along which vines moving across the floor 40 may slide prior to being picked up by the fingers 58. As the conveyor rotates, by means to be described, the fingers will lift these vines and carry them upward along the upper surface of the plates 64 for entry into the passageway 16.

Figure 9:
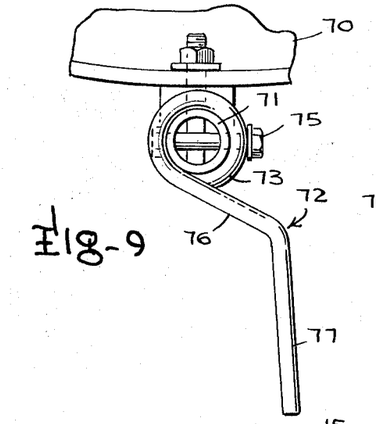
FIG. 9 is a side elevation of a portion of one of the stripping drums, illustrating one of the spring fingers carried by the drum.
Figure 10:
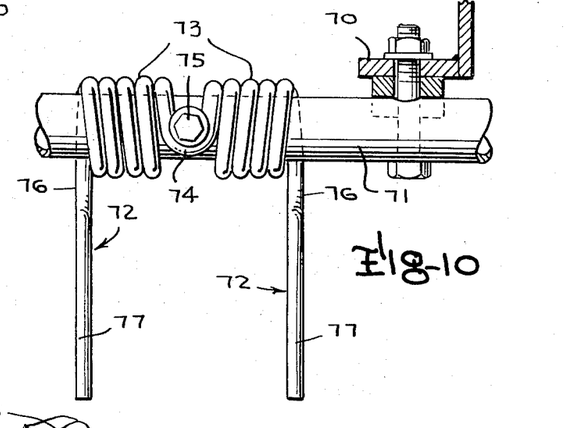
FIG. 10 is a section through one flange of the drum, showing the finger mounting rod and a finger unit connected to the rod.
Figure 11:
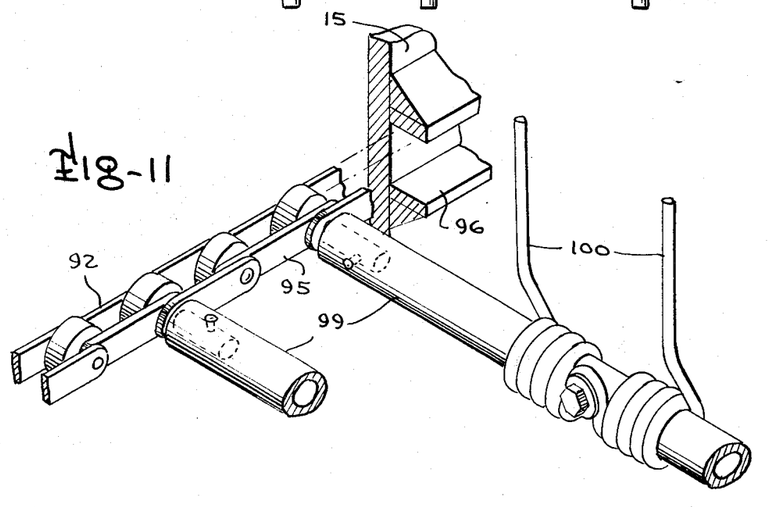
FIG. 11 is a fragmentary perspective view of a chain and its guide forming part of a flexible, movable all defining the vine path through the machine.
Figure 12:
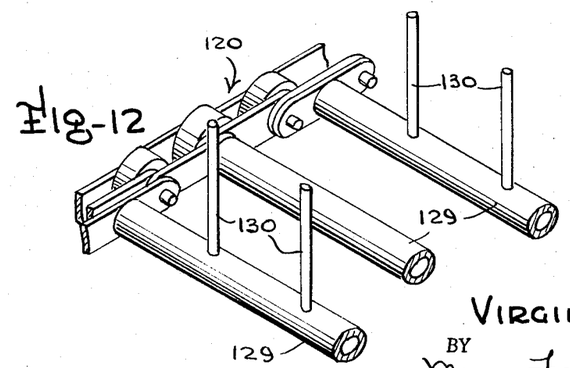
FIG. 12 is a perspective view of a portion of a second chain assembly forming another vine conveying member.

At the entry end of the passageway 16, there is a first pod separating drum 68. This drum is mounted upon by shaft 17 and is rotated in a counterclockwise direction by means to be described. The drum consists of a central cylinder 69, and end disks 70. The disks carry rods 71 spaced about their perimeters, which rods substantially bridge the distance between the sidewalls of the passageway 16. Each of the rods carries a plurality of spring fingers 72, with the fingers being made in pairs, (See FIGS. 9 and 10) and consisting of coils 73 surrounding the rods 71 with a central anchoring loop 74. A fastening bolt 75 secures the spring finger assembly to the rod. The fingers 72 have inclined sections 76, adjacent the rods and sloping away from the direction of rotation of the drum, and radial sections 77 which project substantially radial to the axis of the cylinder. This arrangement provides fingers which will yield under pressure to prevent breakage.

The side walls 15, defining the passage 16, are curved at their front ends and are bridged by a protective wall 78 adjacent the forward section of the drum 68. Flanges 69 extend inwardly around the cured ends of the side plates and continue their arcuate pattern about the major portion of the top of the drum 68. The flanges form mounting seats for rods 80 which span the side walls and carry a plurality of inwardly projecting fingers 81. These fingers are substantially the same as the fingers 72 on the drum, but their position is reversed. The fingers 72 and 81 occupy different vertical planes transversely of the drum, so that the fingers 72 may move freely between fingers 81. As vines are picked up by the fingers 72 and carried upwardly, they are brought in bridging relation to the stationary fingers 81, so that the vines are torn and the pods stripped from the vines.

Beneath drum 68, there is a grid 82, composed of a plurality of bars 83 fixed at one end in a support member 84 extending transversely across the passageway 16. This leaves the front ends of the bars free for spring movement if necessary. Grid 82 will catch any vines which may be carried around to the underside of the drum so that they can be picked up by the fingers and carried back through the stationary fingers and transferred to the next operating mechanism of the machine. The bars 83 are spaced apart a sufficient distance so that any pods which may fall into the area can pass between the bars onto a pod conveyor belt 85. The conveyor is located beneath the grid, to receive pods freed by the action of the drum 68 and the stationary fingers 81, and is an endless belt mounted upon shafts 86 journaled in the side plates, with one being driven as will be described. The upper flight of the belt moves rearwardly in the direction of the arrow in FIG. 4B, to carry pods to the back of the machine and drop them on an incline 87 which extends across the bottom of the passageway 16 at the rear of the drum 68.

Vines which have passed around the drum 68 and been subjected to the stripping action of the fingers of the drum and of the overhead concave, fall from the drum onto the upper flight of a conveyor 88. The top flight of the conveyor 88 has an unobstructed, vine receiving area 89, and a concave section 90 extending beneath the lower portion of a second pod separating drum 91. Conveyor 88 is composed of a pair of chains 92 trained about sprockets 93 mounted on shafts 94 journaled in the sidewalls of the passageway 16. One of the shafts 94 is a driven shaft, as will be described. Chains 92 have their upper flights 95 travelling in grooves 96, formed in the sidewalls of the passage 16, to maintain the upper flights of the chains in the proper contour to form the vine-receiving area 89 and the concave 90. The lower flights 97 move in second grooves 98 to control the movement of the chain, although no specific path pattern is necessary for the lower, or return, flights of the chains. The chains are interconnected by rods 99 which carry spring fingers 100, similar to the spring fingers 72 of the first drum 68. The upper flight of the conveyor moves rearwardly to transport the vines received from the first drum 68 through the operating area including the second drum 91.

The drum 91 is drum similar to the drum 68, as it is mounted on a shaft 101 and has a central cylinder 102 with side disks 103. A plurality of rods 104 is mounted about the periphery of the disks 103, and each rod carries a plurality of spring fingers 105. The only differences between the drum 91 and the drum 68 is that the fingers occupy reverse directions and the drums rotate in opposite directions. It will be noted that the spacing of the upper flight of the conveyor 88 from the drum 91 is such that the fingers of the upper flight of the conveyor and those of the drum move between one another during operation. The speed of the drum will be greater than that of the chain, so that there will be relative movement of the drum fingers through the chain fingers to continue the tearing of the vines and the stripping of the pods from them.

Pods which are removed from the vines during passage through the second drum area will fall through the conveyor 88 onto a belt 106, which will have its forward end beneath the lower end of the incline 87, to receive pods from the incline, and its rear end at a position just to the rear of the rearward termination of the conveyor 88. The belt 106 is inclined upwardly, and its top flight moves toward the rear of the machine. The belt is mounted upon shafts 107 journaled in the side plated of the machine, with one of the shafts being driven as will be described.

Extending transversely of the passageway 16 just above the center line of the second pod-separating drum 91, and in contact with the fingers 105 of the drum, there is a cylindrical brush 108, mounted upon a shaft 109 journaled in the side plates of the top housing, and rotated in a direction counter to that of the drum. The brush bristle overlap the spring fingers to a considerable extent, so that the brush will sweep clinging vine segments from the fingers so that there will be no recirculation of these segments, and the fingers will be clean when they begin their next operative engagement with the vines. The rotation of the brush will tend to sweep the segments from the spring fingers and throw them in a generally rearward direction. A second brush 110 is located just at the rear end of the conveyor 88, so that its bristles are in sweeping contact with the spring fingers 100 of the conveyor. Brush 110 is mounted on a shaft 111, and rotates in a direction opposite to that of the brush 108. Due to the direction of rotation of the brush 110, the rotational movement of the fingers 100 about the sprocket at the end of the conveyor 88, and the position of brush 110 below and slightly to the rear of the brush 108, vines released from the fingers of the drum 91 and the conveyor 88 will be carried over the top of the brush 110 for feeding to a third pod-separating drum 112.

By the time the vines reach the drum 112, they have had most of the pods stripped from them, and the vines have been torn into relatively small fragments. Therefore, the drum 112 is considerably smaller than the first two drums, and its action is slightly different to ensure separation of the few remaining pods from the vines. The drum is mounted on a shaft 113, has a central cylindrical portion 114 and end disks 115. Rods 116 bridge the disks and carry spring fingers 117. In this instance, the spring fingers are straight fingers, rather than the angularly formed fingers of the two previously described drums. The drum rotates in a counterclockwise direction, so that some of the vine sections fed rearwardly over the top of the brush 110 will be lifted by the fingers 117 and carried over the top of the drum. These vine sections will be subjected to a further stripping action by a plurality of radially positioned fingers 118 which are directed inwardly from a concave 119 overlying the upper portion of the drum 112 and bridging the space between the walls of the passageway 16.

The major portion of the vine segments fed rearwardly by the brush 110 will fall upon the upper flight of a conveyor 120, which has its upper flight moving in an arc beneath the lower portion of the drum 112 to form a lower concave with which the spring fingers act. The concave section 121 of the conveyor merges at its rear into a straight trash-transporting section 122. As was the case with the conveyor 88, the upper and lower flights of the conveyor 120 are carried in grooves at the sides of the passageway 16 in order to maintain the desired configuration of the respective parts of the conveyor. The conveyor is mounted upon a shaft 124 at the front end, and a shaft 125 at the rear. Sprockets 126 and 127 are mounted on the respective shafts, and chains 128 move over the sprockets, through the grooves and define the upper and lower flights of the conveyor. The conveyor chains are bridged by rods 129, and these rods carry straight spring fingers 130. As the upper flight of the conveyor 120 is moving toward the rear, and the drum 112 is rotating counterclockwise, the fingers of the drum and the fingers of the upper flight of the conveyor are moving in opposite directions so as to obtain a positive stripping action on the vine segments being carried by the conveyor.

Just above the leading end of the trash transmitting section 122 of the conveyor 120, there is a third cylindrical brush 131, positioned so that its bristles sweep the spring fingers of the conveyor as they pass the brush. This brush lifts the trash, or remaining segmented vines, from the fingers and loosens the mass so that the entire vine accumulation can be freely deposited at the outlet end 132 of the machine. It is to be noted that the upper portion of the passageway 16 above the section 122 of the conveyor is closed, as at 133, and there is a bottom partition 134 spanning the passageway just below section 122 of the conveyor. The converging walls of the top 133 and partition 134 define the trash outlet 132.

Pods which are separated from the vines during the passage through the drum 112 area fall downwardly onto a pod conveyor 135 which is located to receive pods from the endless conveyor 106, as well as pods from the drum station 112, and carry them upwardly and rearwardly to a discharge chute 136. The conveyor is in the form of an endless belt trained about shafts 137, one of which is driven as will be described.

Discharge chute 136 is formed by means of an inclined plate 138, which extends downwardly and rearwardly from the trailing end of the pod conveyor 135. The plate 138 bridges the passageway 16 and forms the front wall of the chute. The rear wall of the chute is formed by means of an upwardly and rearwardly inclined belt 139 which is trained over shafts 140, and has its inner face, that is the face confronting the inclined plate 138, travelling in an upward direction. The inclined plate 138 has its lower end at the outlet 141 from a fan chamber 142. Within the chamber there is a fan 143 mounted upon a shaft 144. As the fan chamber outlet 141 is located at the bottom of the pod discharge chute 136, pods falling downwardly in the chute will pass across the air stream coming from the fan outlet, and trash and other light debris which is mixed with the pods will be blown from the pod stream rearwardly, and in an upward direction, against the rapidly moving face of the belt 139. The belt will carry the trash upwardly over its top to be thrown out and mingled with the trash coming from the outlet 132 of the machine.

The bottom of the discharge chute is formed by an endless belt 145 which is mounted on shafts 146 and has its upper flight moving outwardly to one side of the machine. The outer end of the belt 145 is located above a pod conveyor 147, which extends from a position beneath the discharge end of the belt 145 upwardly and forwardly to a position above a trough 148 which leads into one end of a pod storage bin 149. The conveyor 147 is located adjacent one side of the machine and is composed of a pair of side rails 150, (See FIGS. 1 and 3) which carry bearings 151 at the lower end for a shaft 152, and bearings 153 at the top for a shaft 154. A conveyor belt 155 is trained over the shafts 152 and 154. Pods which are deposited on the lower end of the conveyor 147 from the belt 145 will be carried upwardly to the trough 148 and dumped into the trough. The pods will be carried inwardly to the bin by means of a screw conveyor 156 mounted in the bottom of the trough and rotated by its shaft 157 in a direction to carry the pods inwardly into the bin (See FIG. 3).

Bin 149 overlies substantially the entire passageway 16. It has sidewalls 158 fixed to cross beams 159 which bridge the machine housing. It has an inclined front wall 160 and a vertical rear wall 161. The bottom of the bin is formed by a conveyor belt 162. This belt is mounted upon a shaft 163 at the front and a shaft 164 near the back of the bin. Pods carried inwardly by the screw conveyor 156 will fall down the inclined front wall 160 onto the top flight of the conveyor and, when the conveyor is being operated, will be carried forwardly along the conveyor to the forward portion of the bin. This allows the pods to accumulate at the rear and to be moved forwardly as necessary.

When the bin is about full, or a pod transporting vehicle is available, the conveyor 162 can be set in operation to move the entire pod accumulation toward the front end of the bin. When the pods fall off of the front end of the conveyor 162, they drop onto a transverse belt 165, which is located beneath the bottom of the bin and extends completely across the bin bottom and beyond to a point exteriorly of the machine. The belt 165 is mounted upon the shaft 166 located at the far side of the bin, and a shaft 167 located on the outside of the machine housing. Shaft 167 is journaled in bearing plates 168 which are attached to the outside of the machine housing and project outwardly.

Figures 5, 8:
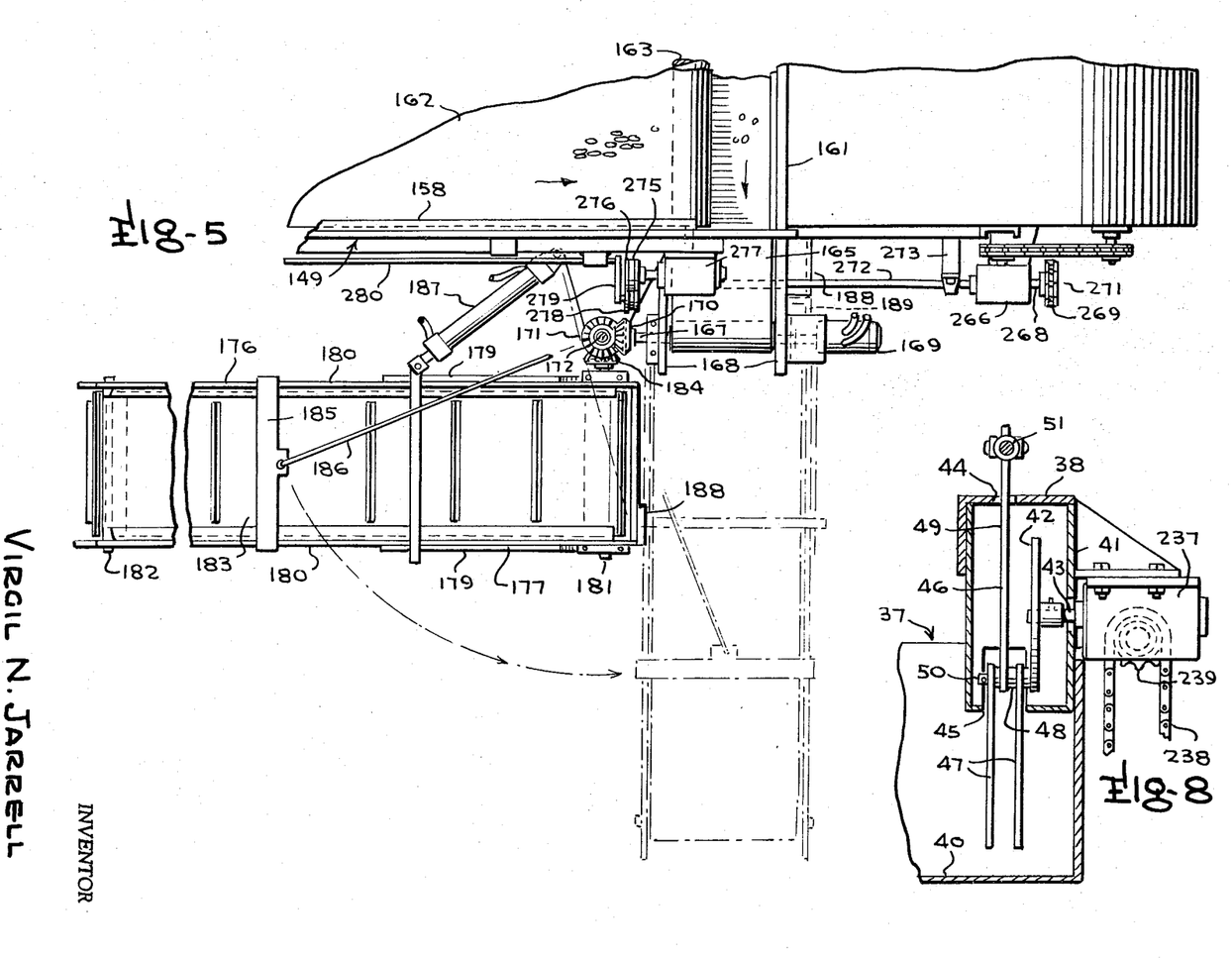
FIG. 5 is a partial plan view of a portion of the pod accumulating bin and the conveyor that carries pods from the bin to a transporting vehicle or place of storage.
FIG. 8 is a section taken on the line 8—8 of FIG. 7.

Shaft 167 carries a hydraulic motor 169 on its forward end, operated in a manner to be later described, and carries a bevel gear 170 on its rear end. Gear 170 is in mesh with a bevel gear 171 mounted on a vertical shaft 172 which is journaled in bearings 173 attached to the vehicle frame. Gear 171 is actually mounted on the top of a sleeve 174 which is freely rotatable on shaft 172 and carries a second bevel gear 175 at its lower end. This gear provides driving power for an unloading conveyor 176 which is pivotally mounted on the shaft 172 for rotation to and from operative position. The conveyor 176 is mounted upon bracket 177, which has a mounting sleeve 178 swingably mounted on the lower portion of the shaft 172. The bracket also has two upwardly extending arms 179 which support the frame of the unloading conveyor 176. The conveyor consists of side rails 180 connected to the arms 179 of the mounting bracket, and these side rails are connected by means of a lower shaft 181 and an upper shaft 182. A conveyor belt is trained over the shafts 181 and 182. The conveyor is driven from the lower shaft 181 by means of a bevel gear 184 on the end of that shaft and in mesh with the bevel gear 175 on the lower end of the sleeve 174. The conveyor as a whole is braced by means of a bracket 185 connected to the side rails of the conveyor frame, and a radius rod 186 which extends from the bracket 185 to the vertical shaft 172. The conveyor mechanism is moved from an inoperative position parallel to the machine frame to an operative position at right angles to the machine frame by means of a cylinder assembly 187. The assembly is connected to the machine frame and to the conveyor frame. When the cylinder is actuated to elongate the conveyor assembly moves about the shaft 172 as a pivot until it comes to its operative position with its inboard end directly beneath the transverse belt 165. The two positions are shown in FIG. 5. As the conveyor assembly approaches its operative position, a stop bracket 188 on the conveyor frame contacts a stationary stop 189 carried by the machine frame. When the belts 162, 165 and 183 re in motion, pods will be moved through the bin to the rear end, and transversely out of the bin and up the unloading belt 183 for deposit in a place of storage or a transporting vehicle. When the bin is unloaded, the conveyor 176 will be returned to its inoperative position by means of the cylinder assembly 187.

Except for the conveyors 165 and 176, the moving parts of the machine are all powered from the power plant 6. The power plant has a power takeoff shaft 11 which carries pulleys 191. Belts 192 transmit the power from the pulleys 191 to pulleys 193 on the input shaft 194 of a hydraulic power converter 195. The power unit 195 has an output shaft 196 with a sprocket 197 on one end and sprockets 198 and 199 on the other end. Sprocket 197 drive a forward jack shaft 200, which drives most of the moving mechanisms on the forward part of the machine, and a jack shaft 201, which drives most of the mechanisms on the rear part of the machine. Sprocket 198 drives the second pod separating drum 91 and the pod elevating conveyor 147. The sprocket 199 drives the brush 108 at the rear of the drum 91.

The drive from sprocket 198 is by means of a chain 202 which engages the sprocket 198 and a sprocket 203 mounted on shaft 101 of the second pod stripping drum 91. Shaft 101 carries a second sprocket 204 which carries a chain 205 that also passes around a sprocket 206 mounted on an idler shaft 207 mounted beneath the pod elevating conveyor 147. A second sprocket 208 is fixed to the shaft 207 and carries a chain 209 which passes about a sprocket 210 on the upper shaft 154 of the elevating conveyor. This shaft also has a sprocket 211 which drives the screw conveyor shaft 157 by means of a chain 212 which passes over the sprocket 211 and a sprocket 213 on the shaft 157.

Sprocket 199 drives the brush 108 by means of a chain 214 which passes around the sprocket 199 and around a sprocket 215 mounted on shaft 109 which supports the brush. Thus, whenever power is turned on, the brush will rotate.

Drive sprocket 197 powers the jack shafts 200 and 201 by means of a chain 216 which passes over the sprocket 197 and over sprockets 217 on the shaft 200 and 218 on the shaft 201. In view of the fact that chain 216 passes over the top of the sprocket 197, an idler sprocket 219, fixed to the machine frame, is used to hold the flights of the chain in spaced relation and provide for the necessary direction change.

The shaft 200 passes completely through the machine and, on the opposite side from the sprocket 217, the shaft carries another sprocket 220, which is the driving sprocket for the forward moving parts. A chain 221 on sprocket 220 also engages a sprocket 222 which is mounted on the shaft 17 which drives the first pod stripping drum 68. A second sprocket 223 on the shaft 17 carries a chain 224 which passes around a sprocket 225 on the rear shaft 86 of the pod conveyor belt 85. A third sprocket 226 is carried by shaft 17 to drive the vine pickup and feed unit 19. This sprocket drives a chain 227 which is mounted on a sprocket 228 carried by the upper shaft 54 of the endless conveyor 53 for feeding vines from the pickup section to the first pod separating drum. The lower shaft 24 of the conveyor unit carries a sprocket 229 that drives a jack shaft 230, carried by the side frame 26 of the vine pickup unit, by means of a chain 231 and a sprocket 232 mounted on the jack shaft 230. The jack shaft carries a sprocket 233, which, by means of a chain 234 and a sprocket 235 on the vine pickup reel shaft, supplies the power to rotate the vine pickup reel. Jack shaft 230 carries still another sprocket 236 which drives a gear box 237 at one side of the transverse condenser 37 by means of a chain 238 which passes over the sprocket 236 and a sprocket 239 on the gear box shaft. The output shaft from the gear box is the shaft 43 which drives the disk to move the condensing fork through its cycle of operation. The gear box 240 on the opposite side of the condenser unit has a sprocket 241 on its input shaft, and this sprocket is driven by a chain 242 which passes around a sprocket 243 on the opposite end of the lower feed conveyor shaft 54 from the sprocket 229. By using the two gear boxes, the two disks 42 can be rotated in opposite directions so as to provide the proper condensing motion for the condensing forks.

Jackshaft 201 extends through the machine and carries a drive sprocket 244 on its opposite end. This sprocket drives a chain 245 which passes over a sprocket 246 mounted on the shaft 113 which supports, and rotates, the third pod stripping drum 112. Chain 245 also passes around a sprocket 247 fixed to the end of the rear shaft 137 of the pod conveyor 135. Idler sprockets 148 are fixed on shafts carried by the machine frame on either side of the sprocket 246 to ensure adequate contact between the sprocket 246 and chain 245. Shaft 113 carries a second sprocket 249 which, by means of a chain 252, drives a sprocket 250 on the shaft 251, carrying the brush 131 mounted over the trash transporting section 122 of the rearmost vine conveyor. Suitable idler conveyors may be used to cause the chain to follow a desired path. Jackshaft 201 carries another sprocket 253 to drive the brush 110 and the chain concave 88 beneath the second pod stripping drum 91. A chain 254 is trained about the sprocket 253 and over a sprocket 255 on shaft 111, and about a sprocket 256 on the rearmost shaft 94 of the chain concave 88.

Shaft 137 at the rear of the last pod conveyor carries two additional sprockets, a sprocket 257, which drives shaft 125 at the rear of the vine conveyor 120 by means of a chain 258 which is trained over the sprocket 257 and a sprocket 259 on the shaft 125, and a sprocket 260 which drives a sprocket 261 on the rear shaft 107 of the belt 106 by means of a chain 262.

The only remaining drive is on the opposite side of the machine. This is taken from the shaft 125 by means of a sprocket 263 on that shaft and is used for driving parts of the pod handling mechanism. Sprocket 263 drives a chain 264 which is trained over a sprocket 265 on a gear box 266 fixed to the machine frame. Chain 264 also passes around the sprocket 267 fixed on the lower shaft 140 of the trash belt 139 at the rear of the discharge chute 136. From the gear box 262 there is a rearwardly projecting shaft 268 which carries a sprocket 269 and drives a sprocket 270 on the inner shaft 146 of the belt 145 at the bottom of the pod discharge chute 136 by means of a chain 271. A shaft 272 extends forwardly from the gear box 266 and is mounted in bearings 273 on the machine frame. At its forward end, shaft 273 carries a pulley 274, and a belt 275 runs around this pulley and a second pulley 276 on the input shaft of a gear box 277. The output shaft of the gear box is the shaft 164 of the conveyor belt 162 at the bottom of the pod storage hopper 149. As it is not desirable for the belt 162 to move continuously, belt 275 is sufficiently loose so that continuous rotation of the shaft 272 does not cause operation of the gear box 277. A belt tightener roller 278 is mounted on an arm 279 fixed to the end of a shaft 280. Shaft 280 is journaled in bearings along the side of the pod storage bin, and has an operating handle 281 at its end adjacent the operator's seat 7. By rotation of the handle 281, the belt tightener roller 278 is caused to move to and from belt tightening position. When the roller is in operative position, the belt is tightened and motion is transmitted from the shaft 272 to the gear box to cause belt 162 to move forwardly to shift accumulated pods toward the rear of the bin.

The power takeoff shaft 11 carries a pulley 282 for driving the blower 142 at the discharge end of the machine. The blower has a pulley 284 on its shaft 144, and a belt 283 is positioned about the pulleys 282 and 284.

In operating the device, the driver will mount the driving position and sit upon the seat 7. He will then start the power plant 5, and, if the vine pickup and feeder assembly 19 is in lowered position, he will operate the cylinder assemblies 23 to raise this mechanism from the ground. He will the operate the conventional controls of the power unit to engage the driving wheels 9 and drive the machine to the field where the vines are to be picked up and the pods harvested. Upon reaching the field, the cylinder assemblies 23 will be operated to lower the vine pickup and feeding assembly 19 to place the ground wheels 22 in contact with the ground and permit the vine pickup section to have free floating motion as the wheels is mixed follow ground contour. When ready to commence the harvesting, the operator will engage the conventional controls (not shown) of the power unit to connect the power takeoff shaft 11 to the power plant. When this is done, the various operating mechanisms of the machine will be in motion.

As the machine moves across the the pickup fingers 31 will engage the vines, much in the manner of the tines of a pitchfork, and carry them upward over the surface formed by the tops of the curved strips 34. As the fingers 31 pass beyond the vertical, they move off of the cam 33 and are free to swing about their pivots to withdraw from the vine mass as the disks continue their rotation without materially disturbing the mass. fingers the vines are continuously fed over the surface 34, they move backwardly and drop off of the curved strips onto the floor 40 pods the condensing unit 37. Here, the tines 47 of the condensing forks push the vines at the outer edge of the moving mass inwardly so as to reduce the width of the mass and provide the pod depth for maximum efficiency of operation of the stripping members. The incoming vines will cause the mass on the floor 40 to move rearwardly and to be picked up by the fingers 58 of the feeding conveyor 53. Here, again, the vines are caused to move across the upper surface of strips 64 to a point adjacent the first pod-stripping drum 68. As the fingers 58 leave their upward path of travel and begin to move around the upper sprocket, they are free from the controlling cam 60 so that they may swing and move out of the vine mass without disturbing the mass.

Drum 68 rotates in a counterclockwise direction as viewed in FIG. 4B, and its fingers 72 will pick up the vines being fed to it and carry them upwardly so that they move between the surface of the skeleton cylinder formed by the rods 71 and the interior surface of the curved plate 78. Thus, the vines are confined as they are brought into contact with the first of the fingers 81 of the upper concave. As the fingers 72 continue their movement, the vines are torn by the opposing forces exerted by the fingers 72 and 81, and many of the pods are torn, or stripped, from the vines. As the pods are freed from the vines, they fall downwardly against the plate 66 or the grid 82, and then onto the upper flight of the pod belt 85. The pods will fall over the rearward end of the conveyor as the belt travels around the shaft 86 and the pods will slide down the incline 87 onto the upper flight of the second pod conveyor 106.

As the fingers 72 pass the region of the fingers 81 of the upper concave, they will throw the vine sections rearwardly so that they will fall upon the rearwardly moving fingers 100 of the movable concave 88 associated with the second pod stripping drum 91. It is to be noted that the fingers of the unit 88 are moving rearwardly and the drum 91 is rotating in a clockwise direction, so that the fingers 100 of the concave and the fingers 105 of the drum are moving in the same direction through the area spanned by the concave. The peripheral speed of the drum, however, is much greater than the linear speed of the upper flight of the conveyor forming the concave 88. Therefore, the action of the fingers of the drum and the concave are somewhat similar to the actions of the fingers in the first stripping area, but as both sets of fingers are moving, the action will not be as harsh. Nevertheless, there will be additional shredding of the vines and almost complete stripping of the remaining pods from the vines. The pods which are stripped from the vines fall downwardly onto the pod conveyor 106 where they are carried rearwardly and upwardly and deposited on the pod conveyor 135. As the fingers of drum 91 move upwardly beyond the rearward end of the concave, they come in contact with the bristles of brush 108 which is rotating so that its bristles will be moving oppositely to the fingers of the drum in the area of contact. This will sweep vine segments from the fingers and throw them rearwardly in the general direction of the brush 111. This latter brush is operating so as to sweep the fingers 100 of the concave 88 and lift the vine segments which are removed upward and over top of the brush.

The vine segments are then moved into the area of the final stripping drum 112. This area has moving fingers in the concave area below the drum, and stationary fingers in the concave area above the drum. The drum is rotating in a counterclockwise direction, and part of the vine mass will be moved around the top of the drum as it is caught upon the fingers 117 of the drum, and part of the mass will be moved around the bottom portion of the drum being caught upon the fingers 130 of the movable concave. Any remaining pods will be stripped from the vines pieces in this area, and the vine mass will be reduced to trash. The pods which are removed fall onto the conveyor 135 and are dumped into the discharge chute. As the pods fall downwardly through the chute, they pass across the outlet from the fan 143, and any light trash which is mixed with the pods will be blown out and against the upwardly moving belt 139, which discharges the trash at the rear of the machine. The trash which is discharged from the drum 112 is carried by the movable conveyor along its trash removing section 122 and discharged through the outlet 132. During its travel along this area, brush 131 frees the trash from the fingers 130 and loosens the mass of vine segments for ready discharge at the end of the conveyor travel.

The pods which fall through the discharge chute came to rest upon the belt 145 at the bottom of the chute and are transported transversely of the machine to the outside of the passage 16. This belt dumps the pods onto the lower end of the inclined conveyor belt 155 which elevates the pods to a point above the top of the pod storage bin 149. When the pods reach the tope belt 155, they drop into trough 148 and are moved transversely by the augur 156 into the storage bin. The incoming pods fall down the inclined end wall 160 of the bin onto the upper surface of the belt 162 which forms the conveyor floor. From time to time, as the pods accumulate at the forward end of the bin, the operator will control handle 281 to bring the tightener roller 278 into contact with belt 275 to drive the belt 172 to advance the pods toward the rear of the bin. Normally, the belt 162 is operated only long enough to move the accumulated pods away from the entrance end of the bin. When the bin is full, or a transporting vehicle is available, the belt 162 will be operated to transport the pods to the rear of the bin where they will fall upon the transverse conveyor belt 165. This belt will carry the pods out of the bin area for deposit onto the unloading conveyor belt 183. Prior to doing this however, the operator will actuate the hydraulic cylinder assembly 187 to swing the loading conveyor 176 about its pivot on the shaft 172 into position of alignment with the belt 165 and with the lower end of the belt 183 beneath the discharge end of the belt 165. As the unloading conveyor swings into position, its stop bracket 188 hits the fixed stop 189 on the machine to limit the movement of the conveyor. when the swinging movement of the conveyor ceases, the hydraulic pressure within the cylinder assembly 187 increases. This increase causes the hydraulic motor 169 to start operation to bring pods from the bin to the unloading conveyor. At the same time, the belt 183 of the unloading conveyor is set into motion. By this particular arrangement, there can be no possibility of dumping the pods onto the ground prior to the time that the unloading conveyor is in position to receive them.

The above operations will be continued as long as drum, a to pick up and harvest all of the vines in a particular field. After all of the vines have been harvested, the power takeoff shaft may be disengaged from the power plant, the vine pickup and feeding assembly 19 may be raised, and the vehicle then transported to another field for use, or to a place of storage.

I claim:

1. A machine for stripping pods from vines comprising, a wheeled frame, a housing on the frame defining a walled passageway, a drum bridging the passageway and mounted for rotation about a longitudinal axis extending transversely of the passageway, fingers carried by the drum and extended outwardly from the drum, a concave formed by one flight of an endless belt bridging the passageway, arcuate guides on the housing positioned about a portion of the drum in which the said one flight moves to maintain a predetermined concave formation, means to advance the endless conveyor, fingers on the conveyor with the fingers on said flight extending toward the drum and overlapping the fingers of the drum, the fingers of the concave being staggered with respect to the fingers of the drum to permit the drum fingers to move between the concave fingers when the drum is rotated, means carried by the frame to pick up vines and feed them to the drum, and means to rotate the drum to carry the vines through the area bridged by the concave.

2. A machine for stripping pods from vines as claimed in claim 1 wherein, the fingers on the drum and the fingers on the conveyor move in opposite directions in the area of the concave.

3. A machine for stripping pods from vines as claimed in claim 1 wherein, the fingers of the drum and the fingers of the concave move in the same direction through the area of the concave and at different speeds.

4. A machine for stripping pods from vines as claimed in claim 1 wherein, there is a pod conveyor beneath the drum bridging the passageway upon which pods fall when stripped from the vine.

5. A machine for stripping pods from vines as claimed in claim 4 wherein, there is a pod storage bin carried by the frame, and means to receive pods from the pod conveyor and transport them to the pod storage bin.

6. A machine for stripping pods from vines as claimed in claim 5 wherein, there is a movable belt in the bottom of the storage bin to move pods toward one end of the bin, and means to unload the pods from said one end.

7. A machine for stripping pods from vines as claimed in claim 1 wherein, there is a second drum bridging the passageway spaced longitudinally from the first mentioned drum, and a second concave about a portion of the second drum, the second drum and second concave having overlapping fingers, and means to rotate the second drum.

8. A machine for stripping pods from vines comprising, a wheeled frame, a housing on the frame defining a walled passageway, a drum bridging the passageway and mounted for rotation about a longitudinal axis extending transversely of the passageway, fingers carried by the drum and extending outwardly from the drum, a concave bridging the passageway positioned about the top portion of the drum and having fingers extending toward the drum and overlapping the fingers of the drum, the fingers of the concave being staggered with respect to the fingers of the drum to permit the drum fingers to move between the concave fingers when the drum is rotated, means carried by the frame to pick up vines and feed them to the drum, means to rotate the drum so as to pick up vines delivered by the vine-feeding means and carry them over the top of the drum through the concave area, a second drum spaced longitudinally of the passageway from the first mentioned drum and mounted for rotation in the passageway, a second concave bridging the passageway and extending about a portion of the bottom of the second drum, the second concave having an end to receive vines cast off by the first mentioned drum after passing through the first mentioned concave area, and means to rotate the second drum so as to move vines through the second concave area.

9. A machine for stripping pods from vines as claimed in claim 8 wherein, the second concave is formed by a flight of an endless conveyor, guides carried by the housing to hold the said flight to concave form, and means to advance the endless conveyor in the direction of drum finger movement through the second concave area and at a slower speed of linear movement than the speed of the fingers of the second drum.

10. A machine for stripping pods from vines as claimed in claim 9 wherein, there are pod conveyor means mounted in the housing below the drums to receive pods stripped from vines during passage on the drums through the respective concave areas and transport the pods from these areas.

11. A machine for stripping pods from vines as claimed in claim 10 wherein, there is a third drum bridging the passageway and mounted for rotation therein spaced from the second drum in the direction of vine travel through the machine, a third concave bridging the passageway and extending about a portion of the top of the third drum, the third drum and the third concave having overlapping fingers, the third concave being fixed to the housing, and means to rotate the third drum to lift vines delivered from the second drum and carry them over the top of the third drum through the third concave area.

12. A machine for stripping pods from vines as claimed in claim 11 wherein, there is a fourth concave bridging the passageway and extending about a portion of the bottom of the third drum, the fourth concave being formed by a flight of an endless conveyor, guide means on the housing to maintain the said flight of the fourth concave in arcuate form, the fourth concave having fingers overlapping the fingers of the third drum, and means to advance the said flight of the fourth concave in a direction contra to the direction of movement of the fingers of the third drum through the area of the fourth concave.

13. A machine for stripping pods from vines as claimed in claim 12 wherein, the pod conveyor extends beneath the third drum.

14. A machine for stripping pods from vines as claimed in claim 13 wherein, there is a rotary brush bridging the passageway adjacent the second drum beyond the area of the second concave in the direction of drum rotation and in sweeping contact with the fingers of the second drum, means to rotate the brush in a direction to sweep vines from the second drum fingers and throw them toward the third drum, a second brush intermediate the discharge end of the second conveyor and the third drum and in sweeping contact with the fingers of the third concave, and means to rotate the second brush in a direction to sweep vines from the fingers of the second concave and move them toward the third drum.

15. A machine for stripping pods from vines as claimed in claim 13 wherein, the said flight of the fourth concave has an extension beyond the third drum in the direction of vine travel through the passageway to move trash from the third drum, the passageway having an outlet through which the said extension dumps trash.

16. A machine for stripping pods from vines as claimed in claim 13 wherein, there is a pod discharge chute at the end of the passageway in the direction of pod travel and the pod conveyor has a discharge end above the chute, a blower having an outlet opening to the discharge chute, and means to move chaff blown from pods falling through the discharge chute from the machine.

17. A machine for stripping pods from vines as claimed in claim 16 wherein, there is a conveyor at the bottom of the discharge chute to carry pods from the discharge chute.

18. A machine for stripping pods from vines as claimed in claim 17 wherein, there is a pod storage bin on the housing, and an elevating conveyor mounted on the machine frame to receive pods from the conveyor at the bottom of the discharge chute and deposit them into the storage bin.

19. A machine for stripping pods from vines as claimed in claim 18 wherein, the elevating conveyor has a discharge end over one end of the storage bin, an endless conveyor at the bottom of the bin to form a floor for the bin, and manually controlled means to move the bin conveyor to move pods from the deposit end toward the opposite end of the bin.

20. A machine for stripping pods from vines as claimed in claim 19 wherein, there is transverse conveyor mounted beneath the bin bottom at the end opposite the pod deposit end to receive pods from the bin conveyor and move them outwardly from the bin.

21. The machine for stripping pods from vines as claimed in claim 20 wherein, there is an unloading conveyor pivotally attached to the machine adjacent the transverse conveyor and movable from a position parallel to the housing to a position in continuation of the transverse conveyor, and means to move the unloading conveyor about its pivotal attachment to the machine.

22. A machine for stripping pods from vines as claimed in claim 13 wherein, the means to pick up vines and deliver them to the first mentioned drum includes a pickup section and a feeding section, the pickup section being of greater width than the feeding section, and means intermediate the pickup and feeding sections to transversely condense the vine mass moving from the pickup section to the feeding section.

23. A machine for stripping pods from vines as claimed in claim 22 wherein, the feeding section is pivotally attached to the frame and the pickup section is pivotally attached to the feeding section, wheels supporting the pickup section to cause the pickup section to follow ground contour, and means to raise the pickup and feeding sections for transportation of the machine.

23 A machine for stripping pods from vines as claimed in claim 22 wherein, the feeding section is pivotally attached to the frame and the pickup section is pivotally attached to the feeding section, wheels supporting the pickup section to cause the pickup section to follow ground contour, and means to raise the pickup and feeding sections for transportation of the machine.